Nov. 17, 1936. J. B. PAARDECAMP Re. 20,174

CONTAINER SEALING AND DISPENSING DEVICE

Original Filed Aug. 30, 1933

John B. Paardecamp
INVENTOR

BY Victor J. Evans & Co.
ATTORNEY

Reissued Nov. 17, 1936

Re. 20,174

UNITED STATES PATENT OFFICE 20,174

CONTAINER SEALING AND DISPENSING DEVICE

John B. Paardecamp, Brooklyn, N. Y.

Original No. 1,959,276, dated May 15, 1934, Serial No. 687,524, August 30, 1933. Application for reissue March 30, 1936, Serial No. 71,813

14 Claims. (Cl. 221—98)

My invention relates to improvements in receptacles for use particularly as a container for coffee and for measuring and dispensing selective quantities of such material.

The important object of the invention is to provide an efficient device for hermetically sealing a coffee container, adapted for use to measure a selected amount of the material while the container is hermetically sealed and to provide for dispensing the measured amount while at the same time maintaining the sealed condition of the container aforesaid.

The invention will be fully and comprehensively understood from a consideration of the following detailed description when read in connection with the acompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

Figure 1:
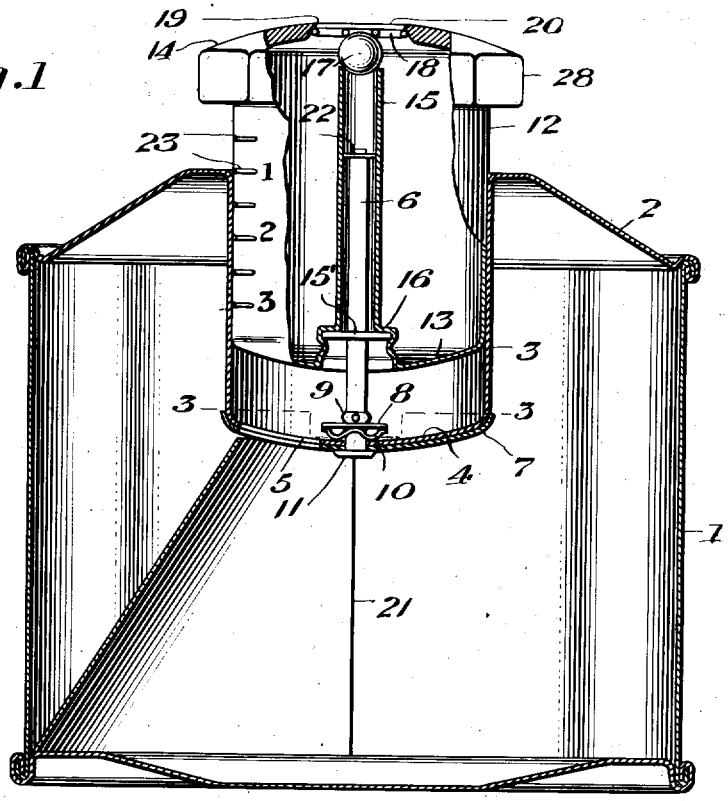
Fig. 1 is a vertical, sectional view of the container equipped according to my invention.
Figure 2:
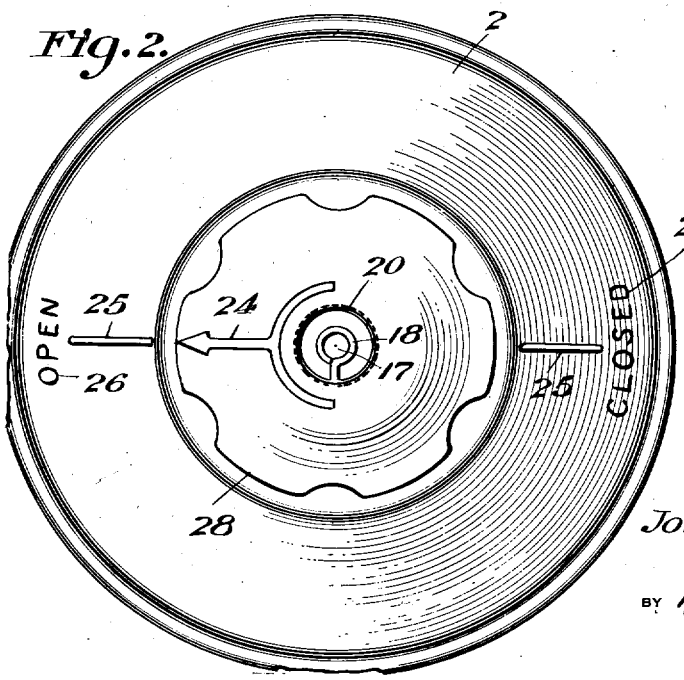
Fig. 2 is a top plan view.
Figure 3:
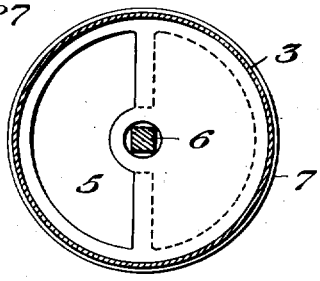
Fig. 3 is a horizontal section taken on line 3—3 of Fig. 1.

Referring to the drawing by numeral, 1 designates a container which may be of any suitable shape and which is preferably cylindrical and is provided with a cover or closure such as shown at 2 in the drawing. Mounted upon the cover 2, axially thereof, is a member 3 forming an open top measuring cylinder having a bottom end portion 4 provided with an inlet aperture 5. Within the cylinder 3, extending axially thereof, is a squared shaft 6 having its lower end rotatably mounted in the bottom portion 4 of said cylinder 3. Fast on the lower end of the shaft 6 is a shuttle member 7 for the aperture 5 and adjustable to aperture closing and opening positions, respectively, the shutter being located exteriorly of the cylinder 3, as will be clear from Fig. 1. On the shaft 6, above the end portion 4, is a washer 8 bearing against a boss 9 on said shaft and urged upwardly by a spring 10. A flange 11 located on the shaft 6, exteriorly of the shutter 7, limits the upward movement of the shaft 6 under the urge of the spring 10, whereby said shutter is yieldingly clamped against said portion 4 of the cylinder 3.

The shaft 6 and shutter member 7 together with the aperture 5 form a valve in the member 3 communicating with the chamber therein formed by the end 4 and the bottom of the piston 12.

Telescoping in the cylinder 3 is a cylindrical stopper 12 forming a rotatable reciprocable piston having a lower end wall 13 and an upper end wall 14 and formed with an axial sleeve 15 open at its opposite ends and receiving the squared shaft 6. At its lower end said sleeve is slidably connected to the shaft 6 by means of a washer 15′ secured in any suitable manner in an enlargement 16 of the sleeve 15 so that said sleeve and shaft are keyed together. At the upper end of the sleeve 15 is a relief valve in the form of a ball 17 seating in the upper end of said sleeve under the urge of a coiled spring 18 seating against a shoulder 19 formed below a relief opening 20 provided in the end portion 14 of the stopper 12.

Within the container 1 is an inclined chute 21 upstanding from the bottom of said container and leading to the inlet aperture 5 of the cylinder 3.

As will be clear, the stopper 12 is slidable in the cylinder 3 to different positions to vary the capacity of the latter and is rotatable in said cylinder to adjust the shutter 7 to opening or closing positions by virtue of the before described connections between the sleeve 15 and the shaft 6. The parts are so arranged that the stopper 12 may be completely withdrawn from the cylinder 3 so that the contents of the latter may be discharged. For this purpose a limiting collar 22 is fast on the upper end of the shaft 6 to be engaged by the washer 15 when the stopper 12 has been sufficiently withdrawn and to prevent its complete removal from the shaft 6.

Suitable means, such as the numbered graduations 23 are provided on the exterior face of the stopper 12 to register with a stationary part of the device so that the stopper may be slid to set positions to measure the amount of substance in the measuring cylinder 3.

The position in which the stopper 12 is to be rotated to adjust the shutter 7 to opening and closing positions is indicated by an arrow 24 on said stopper and ribs 25 on a stationary part of the device suitably designated by the words "open" and "closed" and designated 26 and 27, respectively.

Referring now to the operation, the stopper 12 is first set according to the amount of the substance it is desired to abstract from the container 1, by sliding said stopper in the cylinder 3 until the graduation 23 corresponding to the desired amount is in register with the top of the cover 2. Said stopper 12 is then rotated by means of the hand grip 28 to adjust the shutter 7 to its opening position. The container 1 is then tilted so that the substance is caught in the chute 21 and directed therefrom into the aperture 5, after which the stopper 12 is rotated to move the shutter 7 to its closing position. We now have a measured quantity of substance in the cylinder 3 and the contents of the container 1 is hermetically sealed. The stopper 12 is now withdrawn from the cylinder 3 to the limits of its movement, as determined by the collar 22 and washer 15 and the contents of the cylinder 3 may be discharged. When the stopper 12 is again inserted in the cylinder 3 any back pressure of air or gas due to such insertion will find an outlet through the sleeve 15 and ball valve 17 and opening 20, as will be clear.

What I claim as new is:

1. In a device of the class described, a container, a cover therefor including an open top measuring cylinder having an inlet aperture in its lower end, a cylindrical stopper closed at its lower end, slidable to different set positions in said measuring cylinder to vary the capacity of the latter and also rotatable in said cylinder, a shutter for said aperture and adjustable to opening and closing positions, respectively, and operating connections between the stopper and shutter for adjusting said shutter to opening and closing positions by rotation of said stopper in any set position of the latter.

2. In a device of the class described, a container, a cover therefor including an open top measuring cylinder having an inlet aperture in its lower end, a cylindrical stopper closed at its lower end, slidable to different set positions in said measuring cylinder to vary the capacity of the latter and also rotatable in said cylinder, a shutter for said aperture and adjustable to opening and closing positions, respectively, and operating connections between the stopper and shutter for adjusting said shutter to opening and closing positions by rotation of said stopper in any set position of the latter, and a chute inclined from the bottom of the container to said aperture for directing the contents of said container into said measuring cylinder.

3. In a device of the class described, a container, a cover therefor including an open top measuring cylinder having an inlet aperture in its lower end, a cylindrical stopper closed at its lower end, slidable to different set positions in said measuring cylinder to vary the capacity of the latter and also rotatable in said cylinder, a shutter for said aperture and adjustable to opening and closing positions, respectively, and operating connections between the stopper and shutter for adjusting said shutter to opening and closing positions by rotation of said stopper in any set position of the latter, said connections providing for limited withdrawal of the stopper from the measuring cylinder while operatively connected to said shutter.

4. In a device of the class described, a container, a cover therefor including an open top measuring cylinder having an inlet aperture in its lower end, a cylindrical stopper closed at its lower end, slidable to different set positions in said measuring cylinder to vary the capacity of the latter and also rotatable in said cylinder, a shutter for said aperture and adjustable to opening and closing positions, respectively, and operating connections between the stopper and shutter for adjusting said shutter to opening and closing positions by rotation of said stopper in any set position of the latter, and a relief valve in said stopper for relieving back pressure in the measuring cylinder when said stopper is slid inwardly of said cylinder.

5. In a device of the class described, a container, a cover therefor including an open top measuring cylinder having an inlet aperture in its lower end, a squared shaft extending axially of said cylinder and rotatably mounted therein, a shutter for said aperture and fast on said shaft for adjustment to opening and closing positions by rotation of the shaft, a cylindrical stopper closed at its lower end, slidable in said cylinder to different set positions to vary the capacity of the latter and rotatable in said cylinder, said stopper having an integral sleeve surrounding said shaft and open at its opposite ends, a member connecting the shaft and sleeve for rotation of the shaft by the stopper in any set position of the latter, and a relief valve closing the upper end of said sleeve and permitting back pressure to escape from said cylinder through said sleeve when said stopper is slid inwardly of said cylinder.

6. A dispensing device comprising a member forming a chamber, a rotatable reciprocable piston within said chamber, a valve in said member communicating with said chamber and controlled by the rotation of said piston, and a valve in said piston adapted to prevent air from entering said chamber while permitting air to escape therefrom when said piston is reciprocated therein.

7. A dispensing device comprising a member forming a chamber and having a portion adapted to be secured to a container, a rotatable reciprocable piston within said chamber, a valve in said member communicating with said chamber and controlled by the rotation of said piston, and a valve in said piston adapted to prevent air from entering said chamber while permitting air to escape therefrom when said piston is reciprocated therein.

8. A dispensing device comprising a member forming a chamber, a rotatable reciprocable graduated piston within said chamber, a valve in said member communicating with said chamber and controlled by the rotation of said piston, and a valve in said piston adapted to prevent air from entering said chamber while permitting air to escape therefrom when said piston is reciprocated therein.

9. A dispensing device for granular material comprising in combination, a closure member for a container, a depression formed in the wall of the closure member providing a casing chamber, a reciprocable piston therein, an admission valve in the bottom of said chamber, and an air discharge valve carried on said device and responsive to pressure generated in said chamber by said piston to permit air to escape therefrom as said piston is pressed toward the admission valve.

10. In a dispensing device adapted to be held in the hand, a cylinder, a hollow piston therein, an admission valve in said cylinder having a portion connected to and operable by rotating said piston, an air discharge valve in said piston communicating with the interior of said cylinder, and means for limiting the separation of said cylinder and piston as the piston is withdrawn from the cylinder to discharge the contents of same while said admission valve is closed.

11. In a dispensing device, a cylinder, a hollow graduated piston therein slidable to different positions in said cylinder, an admission valve in said cylinder adapted to be opened and closed by rotating said piston therein, and an air discharge valve in said piston communicating with the interior of said cylinder.

12. In combination with a container adapted to be held in the hand, a member supported on said container and having a chamber in communication with the interior thereof, valve means carried on said member to permit withdrawal of material from the container into said chamber, and movable chamber closing means for permitting discharge of said material from said chamber and refilling the same from said container while preventing admission of air from the chamber into the container.

13. The device as claimed in claim 10, wherein said piston and a stationary part of the device are each provided with graduation marks to visually indicate the contents of said cylinder.

14. The device as claimed in claim 10, wherein indicating signs are provided on said piston and on a stationary part of the device, which signs cooperate to indicate the open and closed position of the admission valve.

JOHN B. PAARDECAMP.